United States Patent [19]
Ogihara

[11] 3,839,607
[45] Oct. 1, 1974

[54] CAMERA SHUTTER POWER SWITCH MAINTAINING CONNECTION FOR CAMERAS WITH ELECTRICALLY-OPERATED SHUTTERS

[75] Inventor: Masuo Ogihara, Chiba, Japan

[73] Assignee: Seiko Koki Kabushiki Kaisha, Tokyo, Japan

[22] Filed: Nov. 27, 1972

[21] Appl. No.: 309,677

[30] Foreign Application Priority Data
Nov. 25, 1971 Japan............................46-94708

[52] U.S. Cl............. 200/33 R, 200/1 A, 200/17 R, 200/153 V
[51] Int. Cl.......................... H01h 7/12, H01h 3/48
[58] Field of Search...... 200/1 A, 17 K, 11 G, 17 R, 200/33 R, 153 V, 24, 28, 19 R

[56] References Cited
UNITED STATES PATENTS

| | | | |
|---|---|---|---|
| 1,381,723 | 6/1921 | Makoben................ | 200/153 V UX |
| 2,542,531 | 2/1951 | Jeffrey..................... | 200/153 V UX |
| 2,614,195 | 10/1952 | Kitto.......................... | 200/1 A UX |
| 3,207,860 | 9/1965 | Korsgren, Jr. et al. .. | 200/153 V UX |
| 3,594,527 | 7/1971 | Brant et al................... | 200/11 G X |

FOREIGN PATENTS OR APPLICATIONS

| | | | |
|---|---|---|---|
| 96,076 | 9/1922 | Switzerland..................... | 200/153 V |
| 1,225,742 | 9/1966 | Germany........................ | 200/153 V |

Primary Examiner—James R. Scott
Attorney, Agent, or Firm—Robert E. Burns; Emmanuel J. Lobato; Bruce L. Adams

[57] ABSTRACT

A camera shutter power switch arrangement in shutter control circuitry for use in a camera having an electrically controlled shutter comprises a power switch which connects a power source applying power to an exposure control circuit controlling exposures taken by an electrically operated shutter. The arrangement comprises a lost-motion connection formed by an element on a camera shutter release lever and the power switch effective to maintain the power switch closed applying power to the exposure control circuit, even though the shutter release lever is prematurely released after initiating a photographic exposure. A pin on the shutter release lever cooperates with an opening in a power switch lever to form the lost motion connection and has sufficient clearance to develop a loss of motion or lag in actuation of the power switch by the shutter release lever when it is restored to its rest position under control of its restoring or biasing spring. This lag or loss of motion is sufficient to insure that the power switch is maintained closed for a period of time after release of the shutter release lever, thereby avoiding premature de-energization of the exposure control circuitry of the electrically operated shutter.

4 Claims, 5 Drawing Figures

PATENTED OCT 1 1974  3,839,607

CAMERA SHUTTER POWER SWITCH MAINTAINING CONNECTION FOR CAMERAS WITH ELECTRICALLY-OPERATED SHUTTERS

BACKGROUND OF THE INVENTION

This invention relates generally to cameras provided with electrically operated shutters and more particularly to a power switch maintaining arrangement for use in such cameras.

In cameras having electrically operated shutters, a power switch for controlling application to an exposure control circuit is generally provided. This power switch is operated in conjunction with the operation of the camera release lever or member with which photographic exposures are taken. For example, the power switch may start the operation of a shutter by application of current to an electromagnetic device that causes the shutter to be released mechanically, thereby starting the taking of exposure after the power switch is closed. Then the exposure is completed by de-energizing the electromagnetic circuit at the proper elapsed time determined by a delay circuit. The camera photographer or operator must hold the power switch device in a closed state during the taking of the exposure. It may be that in this type of shutter, a defective exposure can be taken if the photographer prematurely releases the release button prior to termination of the shutter operation, or the release member will somehow reset itself to its initial start or rest position, thereby opening the power switch which in turn interrupts the exposure before the shutter operation is completed causing the taking of an improper exposure.

SUMMARY OF THE INVENTION

It is a principal object of the present invention to provide a power switch arrangement eliminating the premature opening of the power switch applying power to an exposure control circuit, even though the shutter release member may be prematurely released after initiation of an exposure.

The power switch arrangement, in accordance with the invention, is for use in a camera having an electrically controlled shutter. A shutter release lever in the camera is operable in use in a direction for initiating the taking of photographic exposures. A power switch of the shutter circuitry is connected in use to a power source for use in controlling application of power to an exposure control circuit and is controlled by the camera release lever. Restoring means, constructed as a spring, restore the shutter release lever to its initial rest position and if the shutter release lever is prematurely released, a lost motion connection precludes the opening of the power switch prematurely before the completion of the taking of an exposure. The power switch is maintained by maintaining means, comprising the lost motion connection, which maintain the switch connecting the power source to the exposure control circuit for a period of time after the release lever is released. This lost-motion connection is constructed as a pin on the shutter release lever that cooperates with an opening in an arm on a lever of the power switch and a gap or clearance is provided therebetween which provides a lag or loss in motion sufficient for the release lever to commence its restoration to its initial or rest position before the power switch is activated thereby to an open position. This lag or lost motion prevents premature de-energization of the exposure control circuit, and thereby prevents an improper exposure.

Other objects and advantages will appear from the following description of an example of the invention, and the novel features will be particularly pointed out in the appended claims.

DESCRIPTION OF THE PREFERRED EMBODIMENTS

Figure 1:
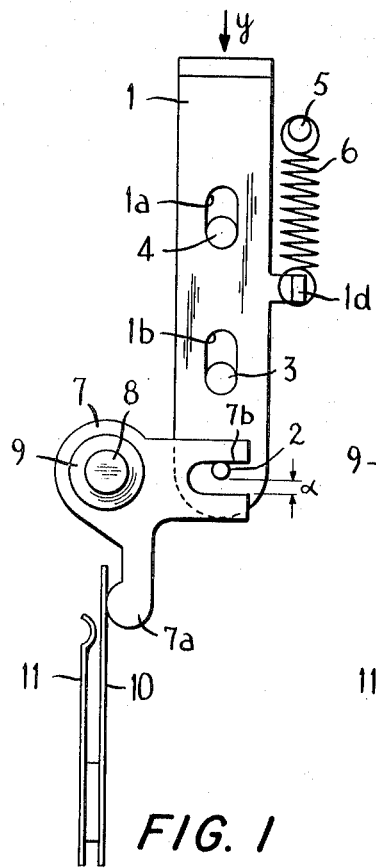
FIG. 1 is a diagrammatic elevation view of a shutter power switch arrangement according to the invention and illustrates the power switch in its open condition.
Figure 2:
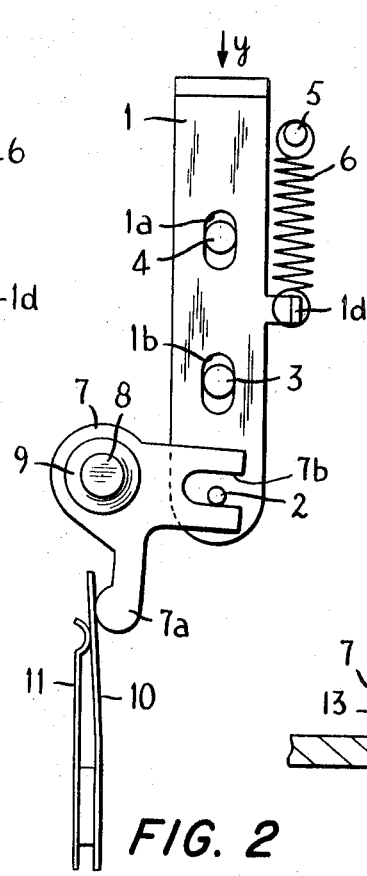
FIG. 2 is a diagrammatic side elevation view of the arrangement in FIG. 1 illustrating the power switch in a closed condition.
Figure 3:
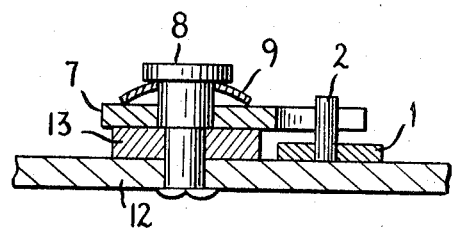
FIG. 3 is a fragmentary section view of the shutter power switch arrangement in FIG. 1.

As shown in FIGS. 1–3 inclusive, a shutter release lever 1 actuated by a camera button and mechanism, not shown, on the camera is mounted for longitudinal movement. It is provided with a pin 2 adjacent one end and axial or longitudinal slots 1a, 1b in which are disposed guide pins 3, 4. The camera shutter release lever 1 is provided with a tab 1d which extends upright normal to the plane of the drawing and a fixed pin 5 is provided aligned therewith and between which is connected a biasing or restoring spring 6 that biases the camera shutter release lever 1, in an upward direction, to a position, illustrated in FIG. 1, in which the camera shutter release member or lever 1 is in a rest position.

The release lever pin 2 is received in a notch or opening of an arm of a shutter power switch lever 7 pivotal on a pivot 8 and biased by a spring 9 to maintain a frictional drag thereon so that an arm 7a of the power switch lever bearing against a spring conductive contact 10, which in conjunction with a fixed contact 11 and the switch lever 7 form a shutter power switch. The movable or flexible contact 10 presses against the switch lever arm 7a and the frictional drag developed by the spring 9 bearing on the switch lever 7 maintaining it against a spacer 13 disposed between the switch lever and a base plate 12 precludes the switch lever from being rotated by the spring contact. The friction or drag developed between the switch lever 7 and the spacer 13 is less than the restoring force of the spring 6.

The diameter of the pin 2 is such that it fits into the notch or opening in an arm of the switch lever 7, as illustrated in FIG. 1 and has a clearance α when the shutter release lever 1 is in its rest position. Since the friction developed by the spring 9 precludes the rotation of the switch actuator or lever 7, the clearance is maintained. When the shutter release lever 1 is actuated downwardly in the direction of the arrow Y, there is a loss of movement between the switch lever 7 and the shutter release lever 1 as it is depressed or actuated in a direction for initiating the taking of an exposure. However, when the shutter release lever pin 2 engages the lower edge of the notch, as illustrated in FIG. 2, the switch lever or actuator 7 is rotated in a clockwise direction, and the arm 7a thereof actuates the movable switch contact 10 into contact with the fixed or stationary contact 11 as illustrated. The switch is accordingly closed. The power switch is connected to a power source to apply power to an exposure control circuit, for example, circuitry for controlling a delay exposure not shown.

As can be seen in the drawings, if the shutter release lever 1 is physically released before an exposure takes place completely, the clearance α provides a time lag before the surface 7b of the notch in the arm 7 is contacted to rotate the switch counterclockwise back to the position illustrated in FIG. 1. This clearance provides a time lag or lost motion that avoids premature disconnection of the switch if for any reason the shutter release lever 1 is prematurely released or for any reason tends to reset itself to its initial position. This time lag is sufficient, in each instance, to maintain the power switch "on" so that the control circuitry, for example, a delay circuit, can properly control the opening of the shutter at the correct time of the completion of an exposure.

Figure 4:
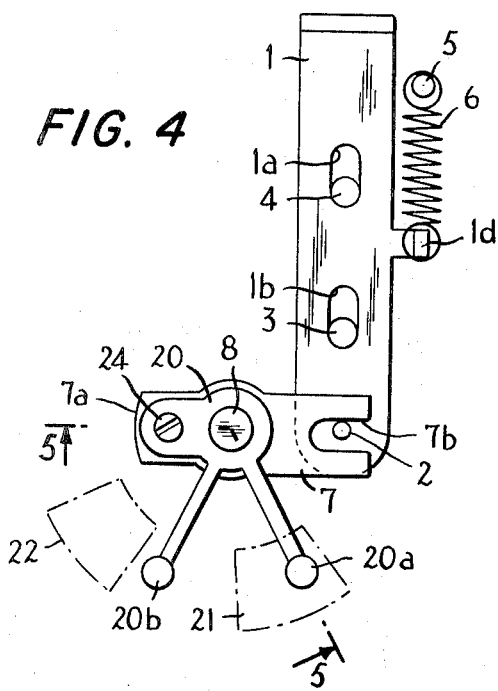
FIG. 4 is a schematic elevation view of a second embodiment of a shutter power switch arrangement according to the invention.
Figure 5:
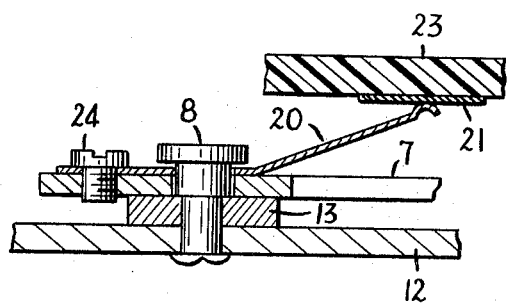
FIG. 5 is a section view of the shutter power switch arrangement in FIG. 5.

A second embodiment of a switch arrangement, according to the invention as illustrated in FIGS. 4 and 5. In this second embodiment, the same reference numerals are applied to parts corresponding to parts of the first embodiment in order to facilitate the understanding of the drawings. In this embodiment, the shutter power switch lever 7 is pivotally mounted on a pivot 8, as before described, and is frictionally engaged with a spacer 13 with a force which is less than the restoring spring 6, as before described. The power switch lever 7 has mounted thereon a pair of movable contacts 20a, 20b fixed thereon by a set screw 24 for rotational movement with the power switch lever 7, which is actuated by the pin 2 and shutter release lever 1, forming in conjunction therewith a lost motion connection as described before.

The two movable contacts cooperate with two angularly spaced fixed contacts 21, 22 which are connected to an exposure control circuit, not shown, functioning as before described with respect to the first-mentioned shutter circuitry. One of the movable contacts 20a makes electrical contact with a fixed contact 21, as illustrated in FIG. 4, when the shutter release lever 1 is in its rest position. When the shutter release lever 1 is depressed or actuated for initiating the taking of an exposure the two movable contacts are moved in a clockwise direction and the second movable contact 20b engages its corresponding fixed contact 22 so that the power switch is closed energizing the exposure control circuitry, as before described.

The restoration of the shutter release plate 1, by its restoring spring 6, to its rest position opens the exposure control circuit and the lost motion connection precludes premature opening of the exposure control circuit, as before described.

What I claim and desire to secure by letters patent is:

1. A camera shutter power switch operating arrangement for use in shutter control circuitry and a camera having an electrically controlled shutter, comprising, a reciprocable camera shutter release lever manually operable in use in a direction for initiating the taking of photographic exposures, a power switch for controlling application of power to an exposure control circuit, restoring means biasing said release lever to a rest position and applying a restoring force thereto and restoring it to said rest position after actuation and release thereof, a switch-operating lever connected to said camera release lever for movement thereby for opening and closing said power switch, means supporting said release lever and said switch-operating lever, means applying a frictional force to said operating lever resisting rotational operation thereof, said frictional force being less than said restoring force, and means on said release lever and said switch-operating lever defining a lost motion connection between said release lever and said power switch for developing a lag between the restoration movement of the release lever toward its rest position and restoration of the switch-operating lever to a rest position thereof by said release lever, whereby premature release of said release lever after manual actuation thereof to initiate a photographic exposure does not affect the exposure.

2. A camera shutter power switch operating arrangement for use in shutter control circuitry and a camera having an electrically controlled shutter, comprising, a reciprocable camera shutter release lever manually operable in use in a direction for initiating the taking of photographic exposures, a power switch for controlling application of power to an exposure control circuit, restoring means biasing said release lever to a rest position and applying a restoring force thereto and restoring it to said rest position after actuation and release thereof, a rotational switch-operating lever connected to said camera release lever for movement thereby for opening and closing said power switch, means supporting said release lever and said switch-operating lever means applying a frictional force to said operating lever resisting rotational operation thereof, said frictional force being less than said restoring force, and means on said release lever and said switch operating lever defining a lost motion connection between said release lever and said power switch for developing a lag between the restoration movement of the release lever toward its rest position and restoration of the switch-operating lever to a rest position thereof by said release lever, whereby premature release of said release lever after manual actuation thereof to initiate a photographic exposure does not affect the exposure, fixed pivot means pivotally mounting said switch-operating lever, said means applying a frictional force comprising a spring member applying said frictional force to said switch-operating lever in a direction axially of said pivot means.

3. A camera shutter power switch operating arrangement for use in shutter control circuitry and a camera having an electrically-controlled shutter, comprising, a reciprocable camera shutter release lever manually operable in use in a direction for initiating the taking of photographic exposures, a power switch for controlling application of power to an exposure control circuit, restoring means biasing said release lever to a rest position and applying a restoring force thereto and restoring it to said rest position after actuation and release thereof, a rotational switch-operating lever connected to said camera release lever for movement thereby for opening and closing said power switch, means supporting said release lever and said switch-operating lever means applying a frictional force to said operating lever resisting rotational operation thereof, said frictional force being less than said restoring force, and means on said release lever and said switch-operating lever defining a lost motion connection between said release lever and said power switch for developing a lag between the restoration movement of the release lever toward its rest position and restoration of the switch-operating lever to a rest position thereof by said release lever, whereby premature release of said release lever after manual actuation thereof to initiate a photographic exposure does not affect the exposure, fixed pivot means pivotally mounting said switch-operating lever, said switch-operating lever comprising an arm having a slot, said means defining said lost motion connection comprising a part of said arm having said slot and a pin on said release lever of lesser transverse dimension than a transverse dimension of said slot extending into said slot.

4. A camera shutter power switch operating arrangement for use in shutter control circuitry and a camera having an electrically controlled shutter, comprising, a reciprocable camera shutter release lever manually operable in use in a direction for initiating the taking of photographic exposures, a power switch for controlling application of power to an exposure control circuit, restoring means biasing said release lever to a rest position and applying a restoring force thereto and restoring it to said rest position after actuation and release thereof, a rotational switch-operating lever connected to said camera release lever for movement thereby for opening and closing said power switch, means supporting said release lever and said switch-operating lever means applying a frictional force to said operating lever resisting rotational operation thereof, said frictional force being less than said restoring force, and means on said release lever and said switch-operating lever defining a lost motion connection between said release lever and said power switch for developing a lag between the restoration movement of the release lever toward its rest position and restoration of the switch-operating lever to a rest position thereof by said release lever, whereby premature release of said release lever after manual actuation thereof to initiate a photographic exposure does not affect the exposure, fixed pivot means pivotally mounting said switch-operating lever, said means applying a frictional force comprising a spring member applying said frictional force to said switch-operating lever in a direction axially of said pivot means, said switch-operating lever comprising an arm having a slot, said means defining said lost motion connection comprising a part of said arm having said slot and a pin on said release lever of lesser transverse dimension than a transverse dimension of said slot extending into said slot, said power switch comprising a slide contact mounted on said switch-operating lever and a switch plate contact, and in which said spring member applying a frictional force comprises a resilient part of said slide contact.

* * * * *